Aug. 13, 1935.                    W. KARSEL                    2,010,920
                              AUTOMOBILE HEATER
                              Filed March 13, 1935

Inventor
William Karsel
By Glenn S. Noble
          Atty.

Patented Aug. 13, 1935

2,010,920

UNITED STATES PATENT OFFICE 2,010,920

AUTOMOBILE HEATER

William Karsel, Chicago, Ill.

Application March 13, 1935, Serial No. 10,896

5 Claims. (Cl. 237—12.3)

REISSUED

JUN 23 1940

This invention relates to heaters particularly intended for use in motor vehicles such as automobiles, trucks, buses, motor cars, or the like, such as are driven with internal combustion engines.

Various types of heaters have heretofore been developed for such purposes, some utilizing the cooling fluid of the engine for the heater radiators, others utilizing steam, and still others utilizing the exhaust gases, but all of such devices have been found more or less objectionable, for reasons which are known to those familiar with this art. In order to avoid the objectionable features of such prior heaters my improved heater is supplied with heat from a source substantially independent of the heat of the engine. In accordance with this invention heat is provided by means of a stove or combustion chamber which is preferably supplied with fuel from the vehicle supply. Means are also provided for forcing or blowing air over such stove or combustion chamber in order to abstract the heat and distribute the same throughout the body of the vehicle. The principal object of this invention is to provide a new type of automobile heater which will be simple in construction and particularly effective and durable in operation.

Other objects are to provide an automobile heater having a combustion chamber and having means coacting with the vehicle engine for supplying or controlling the supply of fuel to said combustion chamber; to provide novel means for igniting the mixture in the combustion chamber and keeping the same ignited; to provide a stove or combustion chamber with suitable connections so that there is little or no possibility of gases of combustion entering the body of the vehicle therefrom; to provide an automobile heater having a closed combustion chamber with a fuel inlet and a gas outlet coacting with the engine of the automobile to supply fuel thereto and withdraw the gases therefrom; to provide a heater of the character indicated, having a relatively small stove for burning gasoline or the like, with a spark plug for igniting the mixture and having means for blowing air thereover and means for directing the air in various directions.

Other objects and advantages will appear more fully from the following description taken in connection with the accompanying drawing, in which Figure 1 is a sectional side view showing the heater as mounted in an automobile;

Figure 1:
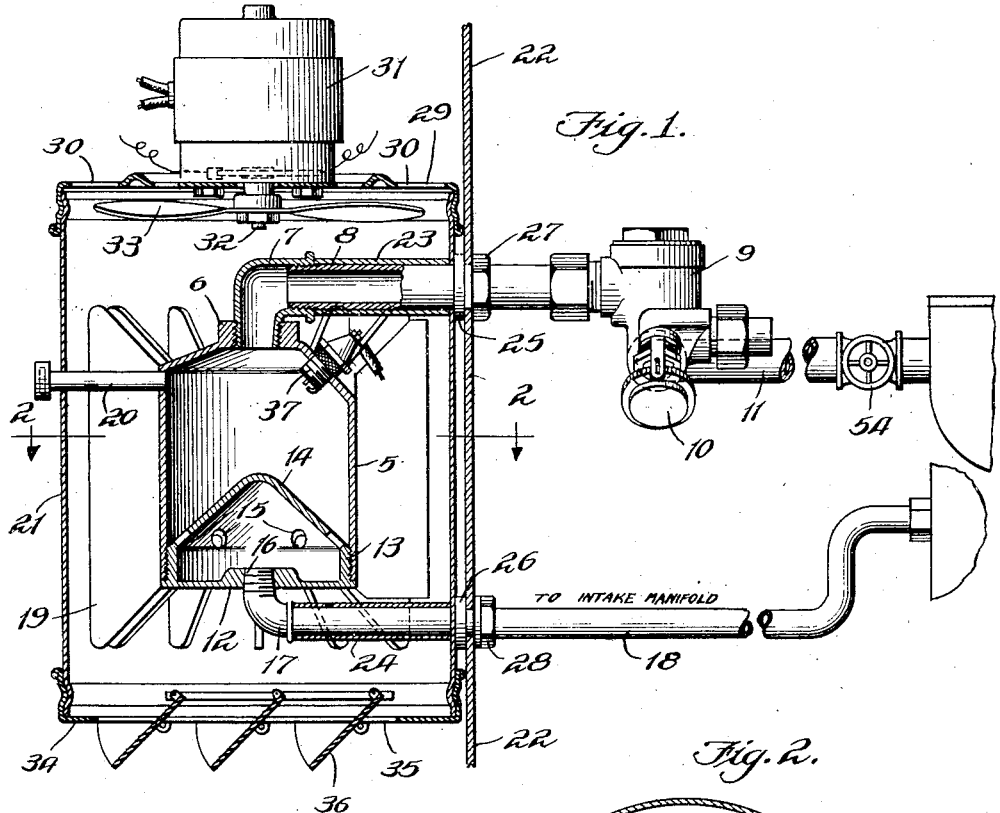

The heater has a combustion chamber or stove including a cylinder or receptacle 5 which is preferably closed at one end and provided with a threaded lug or projection 6 which is engaged by an elbow or connection 7 for connecting the same with an intake pipe 8. This pipe leads to a jet or gas mixer 9 which may be of any suitable type, for mixing the gasoline or fuel with air to make a combustible mixture. The mixer is preferably provided with a controlling valve 10 for regulating the amount of gas or fuel supplied thereto. A fuel pipe 11 leads from the jet or mixer 9 to a source of supply of fuel and preferably to the carburetor of the vehicle engine which, however, is omitted as the particular construction thereof forms no part of the present invention.

The lower end of the cylinder or receptacle 5 is threaded to receive a cap or cover 12 which has a threaded inwardly projecting flange or cylindrical portion 13 which terminates in an upwardly extending conical portion 14 as shown in Figure 1. One or more holes or outlet orifices 15 are provided in the conical portion and preferably at the lower extremity thereof.

The cap or cover 12 has a threaded opening 16 for receiving an elbow or connection 17 which is connected with an outlet or exhaust pipe 18 which leads to the intake manifold of the engine whereby it will be subjected to the vacuum or suction created by the engine. The cylinder or receptacle 5 is preferably provided with a plurality of radially arranged fins 19 which may conveniently be cast integrally therewith for effectively causing heat exchange with the air passing over the stove or combustion chamber. A sight or observation tube 20 of any suitable character having a transparent eye piece is connected with the combustion chamber for convenience in noting whether combustion is taking place therein and also the nature of such combustion.

The stove or combustion chamber is mounted in a casing or housing 21 which is preferably cylindrical and of slightly greater diameter than the outer diameter of the fins.

The heater may be mounted in the vehicle in any desired manner or location but is shown as being positioned on the inner side of the dash 22. The heater is supported by means of the inlet pipe 8 and outlet pipe 18. Spacing tubes 23 and 24 are placed over these pipes and abut against the fittings 7 and 17 and the inner surface of the housing 21. Washers or spacing members 25 and 26 may also be provided between the housing and the dash and the parts are fastened in position by nuts 27 and 28 which engage with threaded portions of the tubes 8 and 18 and with the outer surface of the dash 22 so that the housing 21 and the parts associated therewith are all securely held in position on the dash.

The upper end of the housing 21 has a cap or cover 29 which engages frictionally therewith, or may be otherwise secured thereto, this cap having holes 30 to permit air to pass therethrough. It also furnishes a base or support for the fan motor 31 which is mounted thereon as shown. The shaft 32 of the motor extends downwardly into the housing and is provided with a fan or impeller 33. The lower end of the housing 21 has a similar cap or closure 34 with an outlet opening or openings as indicated at 35 and deflectors 36 are mounted on this cap for deflecting the air passing through the housing, these deflectors being preferably adjustable as indicated, and of any suitable type for the purposes intended. It will also be noted that the lid or cap 34 may be rotated in order to deflect the air in different directions as desired.

Figures 2, 3:
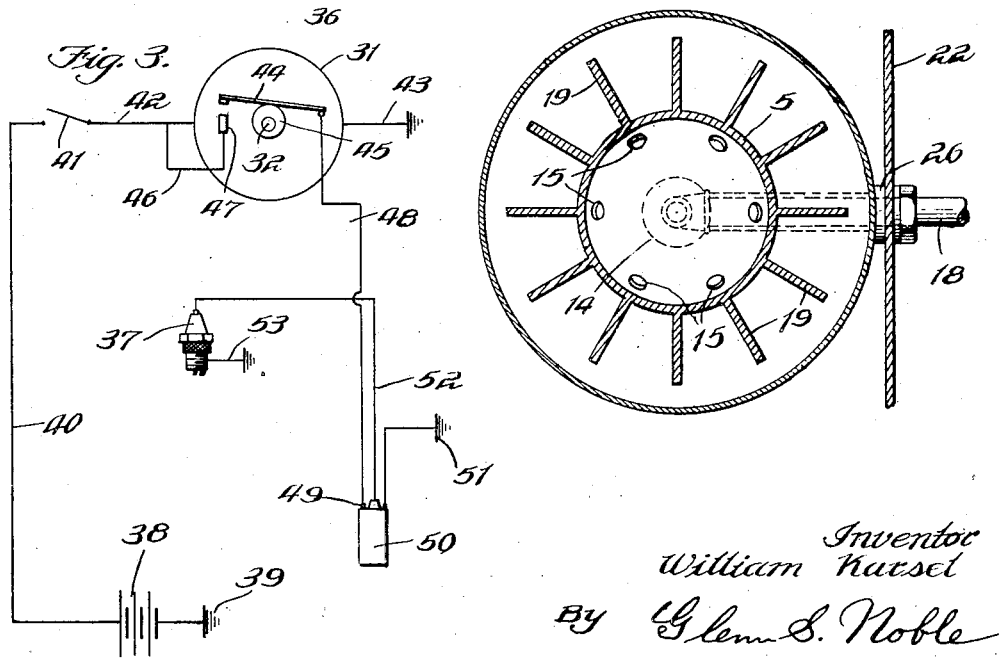
Figure 2 is a cross sectional view taken on the line 2—2 of Figure 1.
Figure 3 is a wiring diagram for the fan motor and ignition circuits.

While the combustible mixture in the combustion chamber may be ignited by any suitable means, I prefer to use a spark plug 37 which is mounted in the upper end of the receptacle 5. The electric current to the plug is also preferably controlled by means actuated by the fan motor as will be seen from the wiring diagram and parts shown diagrammatically in Figure 3. Current is supplied to the motor from a battery or other suitable source of electric supply 38, one terminal of which may be grounded at 39. A wire 40 leads from the battery to a switch 41, the other terminal of which is connected by a wire 42 with one terminal of the motor 31, the opposite terminal being grounded at 43. It will be seen from this circuit that closing and opening the switch 41 will start and stop the motor 31. A circuit breaker or switch 44 is arranged to be actuated as by a cam 45 on the motor shaft 32, the arrangement being such that the switch is preferably opened and closed once for each revolution of the motor. A wire 46 leads from the wire 42 to one contact 47 of the circuit breaker, and a wire 48 leads from the other contact of the circuit breaker to one terminal 49 of a high tension coil 50, the other terminal of this coil being grounded at 51. A high tension wire 52 leads from the coil to the spark plug 37, the other terminal of the plug being grounded as shown at 53.

By means of this electrical arrangement it will be seen that when the switch 41 is closed to start the fan motor 31 to force air through the heater, a circuit will also be closed from the battery through the circuit breaker actuated by the motor and the high tension coil so that the circuit through the coil will be continuously interrupted as long as the motor is running. This causes current of high tension to be supplied to the spark plug in a well known manner so that the plug will ignite the mixture in the stove or receptacle 5.

The operation of my improved heater, as will be readily understood from the above description, is as follows. The shut-off valve 54 in the intake pipe 11 is opened which permits the gasoline or other hydrocarbon fuel from the carburetor, supply line, or other suitable source of fuel supply, to enter the pipe and be conducted to the gas mixer, 9. When the engine is running the vacuum or reduced pressure in the intake manifold causes a suction on the pipe 18 which tends to evacuate the combustion chamber and therefore draws in a supply of mixed fuel and air. It may also be noted in this connection that such suction on the outlet pipe 18 may be provided by a pump (not shown) or any other suitable means. A combustible mixture being provided in the combustion chamber the switch 41 is then closed, thus starting the fan motor and at the same time providing current to the spark plug 37 which will ignite the mixture in the chamber. The combustion in the chamber, or the nature of the combustion therein, may be observed through the sight or inspection tube 20 and by adjusting the adjusting screw 10 of the mixer the desired combustion may be obtained. The gases of combustion are drawn out through the openings 15 into the pipe 18 and from thence to the intake manifold where they may pass along into the engine and if the combustion has not been complete any combustible gases will pass into the engine for further combustion. As long as the engine of the vehicle is being operated the gases will continue to be drawn into the combustion chamber and burned in the manner indicated. When the engine is stopped the combustion will also cease but the parts may be left in operative position so that combustion may again take place as soon as the engine is started. If the fuel is not ignited in the combustion chamber there will be no loss as it will pass along into the intake manifold of the engine. The air driven over the combustion chamber and the fins projecting therefrom, will be quickly heated and will pass out through the bottom of the heater and may be deflected in any direction, as described.

From this description it will be seen that I provide a heater in which the heat may be quickly generated and the heat supply readily controlled regardless of the heat of the vehicle engine. Furthermore the parts within the vehicle body are all closed so that there is little or no possibility of gases of combustion being discharged into the vehicle body so that my improved heater is also particularly safe as well as efficient.

While I have shown and described a practical embodiment of my invention, it will be apparent that modifications may be made in order to adapt the same to different vehicles or different conditions, and therefore I do not wish to be limited to the particular construction or arrangement herein shown and described, except as specified in the following claims, in which I claim:

1. In an automobile heater, the combination of a combustion chamber, an inlet pipe connected with the top of said chamber, a mixer for fuel and air connected with the inlet pipe, a fuel supply pipe leading from the mixer to the fuel supply of the automobile, a baffle arranged adjacent to the bottom of said chamber, an outlet pipe leading from the bottom of the chamber and connected with the intake manifold of the automobile, a housing enclosing said combustion chamber, a motor driven fan for forcing air through the housing and around the combustion chamber, a spark plug operatively mounted in said chamber, a source of supply of electricity, a circuit including said source and said motor, a switch in said circuit, a circuit breaker operated by said motor, an ignition coil, a circuit from said source of supply through said circuit breaker and the ignition coil, and a connection from said ignition coil to the spark plug for supplying current thereto.

2. The combination with an automobile having a closed body and a dash and having an internal combustion engine, of a cylinder having outwardly projecting fins and closed at the top, a pipe leading from the top of the cylinder through the dash and secured to said dash, a generator valve connected with said pipe, a fuel supply pipe leading from the generator valve to the carburetor of the engine, a head detachably secured to the opposite end of the cylinder, a substantially conical baffle projecting upwardly from said head and having outlet passageways therethrough, an outlet pipe leading from the head through said dash and connected to the intake manifold of the engine, means for securing the outlet pipe to the dash, a housing enclosing said cylinder, a cap for one end of said housing having openings therethrough, a motor driven fan mounted on said cap with its fan within the housing, a rotatable cap for the opposite end of the housing having outlet passageways therethrough, adjustable deflectors for said outlet passageways, a spark plug operatively mounted in said cylinder for igniting the mixture therein, means for supplying electricity to said motor, means for supplying electricity to the spark plug, and means actuated by the motor for controlling the supply of electricity to the spark plug.

3. In a motor vehicle having a closed body, the combination of a combustion chamber positioned within the body, pipes from said combustion chamber leading through adjacent portions of the body, means coacting with said pipes for holding the chamber in fixed position in the body, means including one of said pipes for conducting fuel from the fuel supply of the vehicle to said chamber, means for igniting the fuel in said chamber, means including the other pipe for conducting the gases of combustion from the chamber to the intake manifold of the engine, and means for blowing air over said chamber.

4. The combination with a vehicle dashboard, of a substantially closed box providing a combustion chamber, inlet and outlet pipes leading from said box through said dashboard, spacers for holding the box in spaced relation to the dashboard, nuts on said pipes engaging with the board to draw the box toward the same, a connection with one of the pipes to the fuel supply for the vehicle engine, a connection from the other pipe to the intake of the engine, means for igniting a combustible mixture in said box, and a fan for blowing air over said box.

5. In an apparatus of the character set forth, the combination of a heater element including a combustion chamber, a sight opening into said chamber, means for supplying fuel to said chamber, means for withdrawing gases of combustion from said chamber, a spark plug operatively connected with the chamber, a motor driven fan for blowing air across said chamber, and means actuated by the fan for controlling the current to said plug.

WILLIAM KARSEL.